Figure 1:
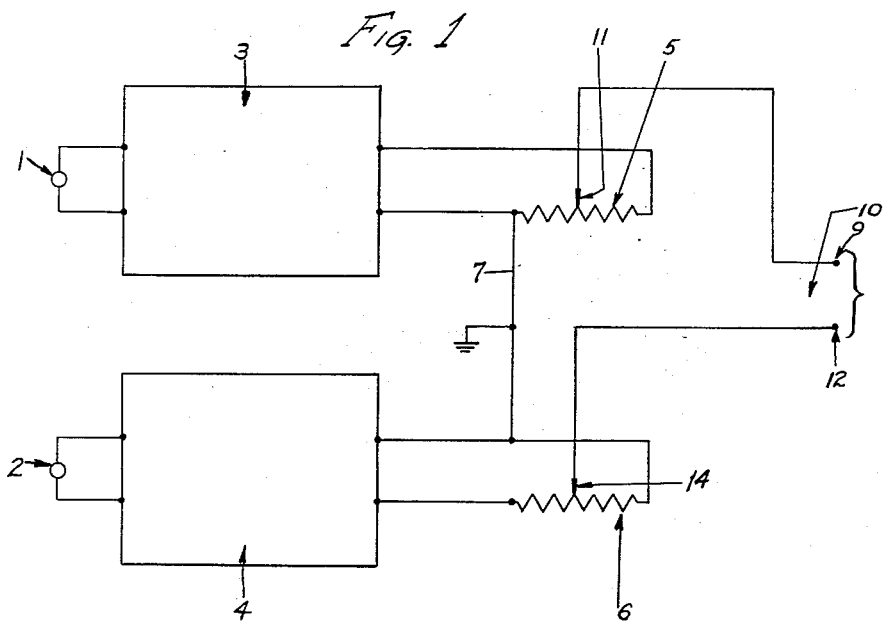

March 1, 1960    F. J. SHIMUKONIS ET AL    2,927,212
SPECTRAL DISCRIMINATION METHOD FOR INFRARED SEARCH
Filed Dec. 17, 1952

INVENTORS
FRANK J. SHIMUKONIS
JAMES R. JENNESS, JR.
BY

United States Patent Office 2,927,212
Patented Mar. 1, 1960

2,927,212

SPECTRAL DISCRIMINATION METHOD FOR INFRARED SEARCH

Frank J. Shimukonis, Elkins Park, and James R. Jenness, Jr., Southampton, Pa.

Application December 17, 1952, Serial No. 326,614

2 Claims. (Cl. 250—83.3)

(Granted under Title 35, U.S. Code (1952), sec. 266)

The invention described herein may be manufactured and used by, or for, the Government of the United States of America for governmental purposes without the payment of any royalties thereon or therefor.

This invention relates to a method for discriminating between infrared radiations from different sources wherein the radiations from each source have a different spectral distribution than those from the other sources. By utilizing the method of the invention, a remote object such as a military target may be detected by means of the infrared radiation emanating therefrom, as for example from its engine, funnel or other sources of infrared rays and may be differentiated from that emanating from sources other than the military target.

Present methods of differentiating between these infrared sources involve the use of single detectors with filters, which pass radiation of the desired wave length and cut down or decrease the intensity of the unwanted radiation. There are no filters available, however, which will completely eliminate unwanted radiation and pass all the target radiation. The present invention represents a method to eliminate the maximum amount of unwanted radiation to a degree unobtainable by present known methods, while at the same time allowing for receiving of maximum target radiation.

A hot target such as an aircraft engine or ship funnel emits radiation which follows behaviour described by physical laws such as the Plank, Wein and Stephan-Boltzman laws. Sources of heat such as the sun, also emit radiation which follows the behavior described by these laws. It is desirable in the problem of detecting a target to eliminate the energy disseminated by sources other than the target and to pick up the maximum amount of energy from the target. The subject invention accomplishes this spectral discrimination by means of two detectors, one detector being sensitive to shorter wave length and the other detector being sensitive to longer wave lengths of infrared radiation. As the sun for example emits both short and long wave lengths and the target emits principally longer wave lengths, a method of discrimination between them is possible. This method is accomplished by this invention.

An important purpose of this invention is to provide a method for discriminating between sources of infrared radiation desired to be detected and unwanted sources of infrared radiation so as to detect maximum radiation from the desired source.

Another object of this invention is to differentiate between infrared radiation from a military target and infrared radiation from other sources.

Another aim of this invention is to provide a spectral discriminating method for application to infrared search, track and homing devices.

A further object of this invention is to provide a maximum target signal with minimum interference from sources of energy other than target sources.

The invention also contemplates provision of an accurate and sensitive method for detecting radiation from a military target.

Figure 2:
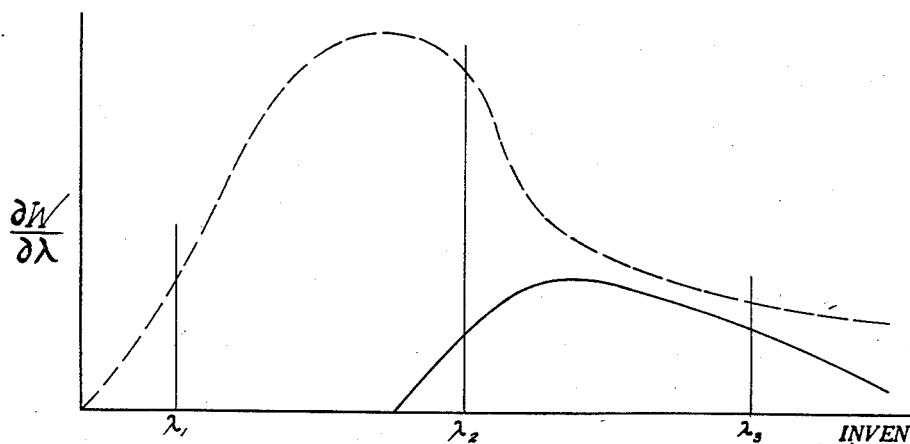

Further objects and advantages of the invention will become apparent from the following description and claims, and from the accompanying drawings wherein:

Fig. 1 represents a schematic diagram of typical apparatus to carry out the present invention, and Fig. 2 represents a graph showing the distribution of emission of infrared radiation of target sources and other sources plotted against wave length.

Referring to the drawings, and in particular to Fig. 2, the broken curve in Fig. 2 represents the intensity of scattered and reflected solar radiation as a function of wave length and the solid curve shows the intensity of target radiation as a function of wavelength. Although the sun's radiation is more intense, its spectral distribution is different from that of the target radiation, as shown on the graph in Fig. 2. The target radiation, for example, has its maximum intensity in the region between $\lambda 2$ wave length and $\lambda 3$ wave length. The radiation from the sun, however, has its maximum intensity and principal distribution in the wave length region between $\lambda 1$ and $\lambda 3$, with some greater concentration in the region of wave length between $\lambda 1$ and $\lambda 2$. The present invention involves the method applicable thereto of balancing undesired source radiation in the band between wave length $\lambda 1$ and wave length $\lambda 2$ against the undesired source radiation in the band between wave length $\lambda 2$ and wave length $\lambda 3$. By balancing out the sun's or other desired radiation in these two portions against each other and by a proper selection of $\lambda 2$ we may detect the resultant target radiation.

As shown in the schematic representation of Fig. 1 a detector 1 detects infrared signals which are fed into and amplified by amplifier 3. In the output of amplifier 3 is a potentiometer 5 across which the output of amplifier 3 is placed. A second detector 2 detects infrared signals which are fed into and amplified by amplifier 4, in the output of which there similarly appears a second potentiometer 6. Potentiometers 5 and 6 are arranged in series with the common line 7 being connected to one output lead of each amplifier 3 and 4. Detector 1 may be made sensitive in the spectral region from $\lambda 1$ to $\lambda 2$ wave length and detector 2 may be made sensitive to the spectral region from $\lambda 2$ to $\lambda 3$ wave length. Various combinations of detectors may be employed. For example, a visible light sensitive photo-cell might be used for detector 1 with a lead sulphide cell for detector 2, or a lead sulphide cell might be used as detector 1 with a thermal detector for detector 2. If similar overall characteristics are desired two detectors of the same type can be used. One detector may be provided with a short wave length filter and the other with a long wave length filter, or one detector might be used with a filter and the other with no filter.

Signals from the target and from other sources of radiation are received at the detectors. The signal generated by each detector is fed through its respective amplifier into the balanced network consisting of potentiometers 5 and 6, the signals being fed in opposite polarity. The signal generated by detector 1 may be mathematically represented as follows:

(1) $$E_1 = \int_{\lambda 1}^{\lambda 2} S_1 \frac{\partial W_S}{\partial \lambda} d\lambda + \int_{\lambda 1}^{\lambda 2} S_1 \frac{\partial W_T}{\partial \lambda} d\lambda$$

The signal generated by detector 2 may be mathematically represented as follows:

(2) $$E_2 = \int_{\lambda 2}^{\lambda 3} S_2 \frac{\partial W_S}{\partial \lambda} d\lambda + \int_{\lambda 2}^{\lambda 3} S_2 \frac{\partial W_T}{\partial \lambda} d\lambda$$

where:

$E_1$ = the signal generated by detector 1.
$E_2$ = the signal generated by detector 2.
$S_1$ = the sensitivity of detector 1.
$S_2$ = the sensitivity of detector 2.
$W_S$ = the intensity of sun radiation.
$W_T$ = the intensity of target radiation.

Since the balance circuit in the output is in opposite polarity, the output may be represented by the following equation:

$$(3) \qquad E_{OUT} = K_2 E_2 - K_1 E_1$$

where $K_1$ and $K_2$ are constants depending upon the particular apparatus used and are determined by the adjustment of the balance circuit. By a suitable adjustment of the balance circuit:

$$(4) \qquad K_2 \int_{\lambda_2}^{\lambda_3} S_2 \frac{\partial W_S}{\partial \lambda} d\lambda$$

can be made equal to $$(5) \qquad K_1 \int_{\lambda_1}^{\lambda_2} S_1 \frac{\partial W_S}{\partial \lambda} d\lambda$$

by adjusting the K factors to make the products equal to each other.

In practice this would be done by balancing the circuit to get zero output when no target is present.

The output from target radiations superimposed on the sun radiation is then:

$$(6) \qquad K_2 \int_{\lambda_2}^{\lambda_3} S_2 \frac{\partial W_T}{\partial \lambda} d\lambda - K_1 \int_{\lambda_1}^{\lambda_2} S_1 \frac{\partial W_T}{\partial \gamma} d\lambda$$

This quantity will not be equal to zero since the spectral distribution of target radiation is different from that of sun radiation. By a suitable choice of $\lambda_2$ the quantity $$(7) \qquad \int_{\lambda_1}^{\lambda_2} S_1 \frac{\partial W_T}{\partial \lambda} d\lambda$$

can be made negligible so that there is no loss of intensity for the signal due to target radiation.

Referring again to Fig. 1, contact 9 of the output 10 is connected to a slider 11 on potentiometer 5 in the detector 1 circuit. The other contact 12 at the output 10 is connected to a slider 14 of potentiometer 6 in the detector 2 circuit. Sliders 11 and 14 are adjusted to get zero output across leads 9 and 12 in the absence of a target signal. The output from target radiation superimposed on the sun's or other unwanted source radiation of the same frequency then is defined by mathematical quantity $$(6) \qquad K_2 \int_{\lambda_2}^{\lambda_3} S_2 \frac{\partial W_T}{\partial \lambda} d\lambda - K_1 \int_{\lambda_1}^{\lambda_2} S_1 \frac{\partial W_T}{\partial \lambda} d\lambda$$

As stated hereinbefore, the factor:

$$(7) \qquad \int_{\lambda_1}^{\lambda_2} S_1 \frac{\partial W_T}{\partial \lambda} d\lambda$$

can be made negligible by proper selection of $\lambda_2$ so that output may be expressed by the quantity:

$$(8) \qquad K_2 \int_{\lambda_2}^{\lambda_3} S_2 \frac{\partial W_T}{\partial \lambda} d\lambda$$

as shown in the mathematical development heretofore expounded. As noted in Fig. 1 the output of each amplifier is connected across a potentiometer. The voltages are developed across the potentiometers in opposite polarity, so that by adjusting the wipers thereon any undesired signal can be balanced out.

Hence, by the employment of two detectors combined with a conventional output balance circuit to balance out signals due to unwanted radiation we may accomplish the solving of the problem of spectral discrimination for infrared devices in a new and improved manner.

Thus we see that a method of discrimination between infrared radiations from different sources, the radiation from each source having a different spectral distribution, may be made. In the illustrative embodiment of the present invention we have a situation wherein one source of infrared radiation, such as the sun, produces radiant energy which is distributed over both the long and short wave portion of an infrared band. The target signal in this case produces radiation which covers the longer wave length section of the band. By detecting a signal in a first detector proportional to the intensity of the shorter wave length radiation from the sun source and detecting its longer wave length portion in another detector we may amplify both detected signals and by means of a balance output may produce a condition of no signal output in the absence of a target. Voltages developed as a result are connected together in opposite polarity, so that by proper adjustment the shorter wave portions may be balanced against the longer wave energies so that a zero signal condition results. The second detector being sensitive to the longer wave length radiations which will emanate from target sources will receive these signals and an amplified signal will be impressed across the output. By measuring the output of this balanced circuit we can then detect the amount of target radiation.

It will readily be apparent that the method described is merely an illustrative embodiment of our invention and that variations thereof will readily occur to one skilled in the art. Other methods of balancing the output from solar or other primary source radiation may be utilized and is considered within the scope of this invention. Application to uses other than detection of military targets also may be made. It is to be understood that the radiation energy distributions shown in Fig. 2 are merely illustrative and that the method herein disclosed may be used for different spectral distributions of radiated energy. The use and embodiment of the specific method are shown merely by way of example.

We claim:

1. A method of discriminating between infrared radiations from different sources, the radiation from each source having a different spectral distribution within the infrared region, the radiations of a source desired to be detected having a spectral distribution substantially confined in a range of the spectral distribution of the sources not desired to be detected, said method comprising detecting the infrared radiations of said undesired sources outside of the range of spectral distribution of said desired source, producing a first output which is a function of the undesired source radiation outside the spectral distribution range of the desired source, detecting the infrared radiations of said undesired sources inside the range of spectral distribution of the desired sources, producing a second output which is a function of the undesired source radiation inside the spectral distribution range of the desired source balancing the first output against the second output in opposite polarity to produce a condition of zero voltage output in the absence of said desired sources of radiation, detecting said desired sources of radiation and producing a measurable output due to the desired source of radiation.

2. A method of discriminating between sources of infrared radiations, the infrared radiations emanating from a first source being of wavelengths distributed over a relatively wide bandwith, the infrared radiations of a second source being of wavelengths principally distributed over a relatively narrow bandwidth, said narrow bandwidth being included in said wide bandwidth, which method comprises detecting the infrared radiations from both sources over the narrow bandwidth, detecting the infrared radiations not included in the narrow bandwidth producing a first output which is a function of the detected radiations not included in the narrow bandwidth, producing a second output which is a function of the detected radiations of narrow bandwidth of the first source and balancing the second output to oppose the first output to a zero value, thereby permitting maximum output from detected radiations from said second source to be produced.

References Cited in the file of this patent

UNITED STATES PATENTS

| | | |
|---|---|---|
| 1,963,185 | Wilson | June 19, 1934 |
| 2,114,163 | Bird | Apr. 12, 1938 |
| 2,144,519 | Wilson | Jan. 17, 1939 |
| 2,392,873 | Zohl | Jan. 15, 1946 |
| 2,489,223 | Herbold | Nov. 22, 1949 |
| 2,490,011 | Bird | Dec. 6, 1949 |

FOREIGN PATENTS

| | | |
|---|---|---|
| 539,420 | France | Apr. 1, 1922 |